(12) United States Patent
Bush et al.

(10) Patent No.: US 12,553,994 B2
(45) Date of Patent: Feb. 17, 2026

(54) AVALANCHE PHOTODIODE GAIN COMPENSATION FOR WIDE DYNAMIC RANGE

(71) Applicant: LUMINAR TECHNOLOGIES, INC., Orlando, FL (US)

(72) Inventors: Adam R. Bush, Plymouth, MN (US); Walter R. Eppler, Cranberry Township, PA (US); Kevin A. Gomez, Eden Prairie, MN (US)

(73) Assignee: Luminar Technologies, Inc., Orlando, FL (US)

( * ) Notice: Subject to any disclaimer, the term of this patent is extended or adjusted under 35 U.S.C. 154(b) by 1115 days.

(21) Appl. No.: 17/462,170

(22) Filed: Aug. 31, 2021

(65) Prior Publication Data

US 2023/0062555 A1    Mar. 2, 2023

(51) Int. Cl.
| | |
|---|---|
| *G01S 7/48* | (2006.01) |
| *G01S 7/4865* | (2020.01) |
| *G01S 7/487* | (2006.01) |
| *G04F 10/00* | (2006.01) |

(52) U.S. Cl.
CPC .......... *G01S 7/4865* (2013.01); *G01S 7/4876* (2013.01); *G04F 10/005* (2013.01)

(58) Field of Classification Search
USPC ....................................................... 356/4.01
See application file for complete search history.

(56) References Cited

U.S. PATENT DOCUMENTS

| | | | |
|---|---|---|---|
| 4,805,236 A | 2/1989 | Urala | |
| 7,599,629 B2 * | 10/2009 | Kamali | ............... H04B 10/6931 |
| | | | 398/202 |
| 8,195,055 B2 | 6/2012 | Vieira et al. | |
| 9,269,845 B2 | 2/2016 | Williams et al. | |
| 10,236,995 B2 | 3/2019 | Featherston et al. | |
| 10,324,170 B1 | 6/2019 | Engberg, Jr. et al. | |
| 10,739,456 B2 | 8/2020 | Kubota et al. | |
| 11,181,638 B2 * | 11/2021 | Marra | ...................... G01S 7/484 |
| 2004/0247327 A1 | 12/2004 | Kamali et al. | |
| 2004/0253003 A1 | 12/2004 | Farmer et al. | |
| 2005/0092899 A1 * | 5/2005 | Wolf | ...................... G01N 21/47 |
| | | | 250/214 R |
| 2011/0158656 A1 | 6/2011 | Vieira et al. | |
| 2013/0221193 A1 * | 8/2013 | Williams | .................. H03F 3/08 |
| | | | 250/206 |

(Continued)

*Primary Examiner* — James R Hulka
(74) *Attorney, Agent, or Firm* — Van Pelt, Yi & James LLP

(57) ABSTRACT

An optical receiver includes a parasitic current compensation circuit having a reference diode, a sense avalanche photodiode (APD), at least one DC voltage source, and a measurement node. The at least one DC voltage source is configured to generate a first DC bias voltage that varies over time and drives the reference diode, and generates a second DC bias voltage that varies over time and drives the sense APD. A reference parasitic current travels through the reference diode based on the first DC bias voltage. A sense current travels through the sense APD based on the second DC bias voltage and exposure of the sense APD to a light signal. The measurement node receives a sense photocurrent, which is generated by the sense APD in response to the exposure of the sense APD to the light signal, the sense photocurrent including the sense current less the reference parasitic current.

10 Claims, 2 Drawing Sheets

(56) References Cited

U.S. PATENT DOCUMENTS

| | | | |
|---|---|---|---|
| 2017/0048003 A1* | 2/2017 | Featherston | H04B 10/11 |
| 2017/0363740 A1* | 12/2017 | Kubota | G01S 7/484 |
| 2019/0051783 A1* | 2/2019 | Hayat | H10F 30/225 |
| 2019/0120961 A1 | 4/2019 | Marra et al. | |

* cited by examiner

AVALANCHE PHOTODIODE GAIN COMPENSATION FOR WIDE DYNAMIC RANGE

SUMMARY

One embodiment of an optical receiver includes a parasitic current compensation circuit, a sense avalanche photodiode (APD), at least one DC voltage source, and a measurement node. The parasitic current compensation circuit includes a reference diode. The at least one DC voltage source is configured to generate a first DC bias voltage that varies over time and drives the reference diode, and generates a second DC bias voltage that varies over time and drives the sense APD. A reference parasitic current travels through the reference diode based on the first DC bias voltage. A sense current travels through the sense APD based on the second DC bias voltage and exposure of the sense APD to a light signal. The measurement node receives a sense photocurrent, which is generated by the sense APD in response to the exposure of the sense APD to the light signal, the sense photocurrent including the sense current less the reference parasitic current.

In another embodiment, an optical receiver includes a parasitic current compensation circuit, a sense APD, at least one DC voltage source, and a measurement node. The parasitic current compensation circuit includes a reference diode. The at least one DC voltage source is configured to generate a first DC bias voltage that varies over time at a first rate and drives the reference diode, and generate a second DC bias voltage that varies over time at a second rate that is opposite the first rate and drives the sense APD. A reference parasitic current travels through the reference diode based on the first DC bias voltage. A sense current travels through the sense APD based on the second DC bias voltage and exposure of the sense APD to a light signal. The measurement node receives a sense photocurrent, which is generated by the sense APD in response to the exposure of the sense APD to the light signal, the sense photocurrent including the sense current less the reference parasitic current.

In yet another embodiment, the optical receiver includes a parasitic current compensation circuit, a sense APD, at least one DC voltage source, and a measurement node. The parasitic current compensation circuit includes a reference diode. The at least one variable DC voltage source configured to generate a DC bias voltage that varies over time and drives the reference photodiode and the sense photodiode. A reference parasitic current travels through the reference diode based on the DC bias voltage. A sense current travels through the sense APD based on the DC bias voltage and exposure of the sense APD to a light signal. The measurement node receives a sense photocurrent, which is generated by the sense APD in response to the exposure of the sense APD to the light signal, the sense photocurrent including the sense current less the reference parasitic current.

Additional embodiments include a light detector having a light detection circuit that is coupled to a measurement node of an optical receiver formed in accordance with one or more embodiments of the present disclosure. The light detection circuit is configured to detect light signals to which the sense APD is exposed based on a sensed photocurrent produced at the measurement node by the optical receiver.

Further embodiments are directed to a light detection and ranging (LIDAR) device that includes a light emitter, a light detector, and an optical receiver formed in accordance with one or more embodiments of the present disclosure. In one embodiment, the light detector includes a light detection circuit that is coupled to a measurement node of an optical receiver and receives a sense photocurrent from the optical receiver. The light detector includes a transimpedance amplifier configured to produce a voltage pulse in response to the sense photocurrent, a comparator configured to compare the voltage pulse to a threshold voltage and produce a comparator output signal, and a time-to-digital converter configured to receive the comparator output signal and determine an interval of time between the transmission of a transmitted light signal from the light signal emitter and an exposure of the sense APD to a reflection of the transmitted light signal from an external object based on the sense photocurrent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
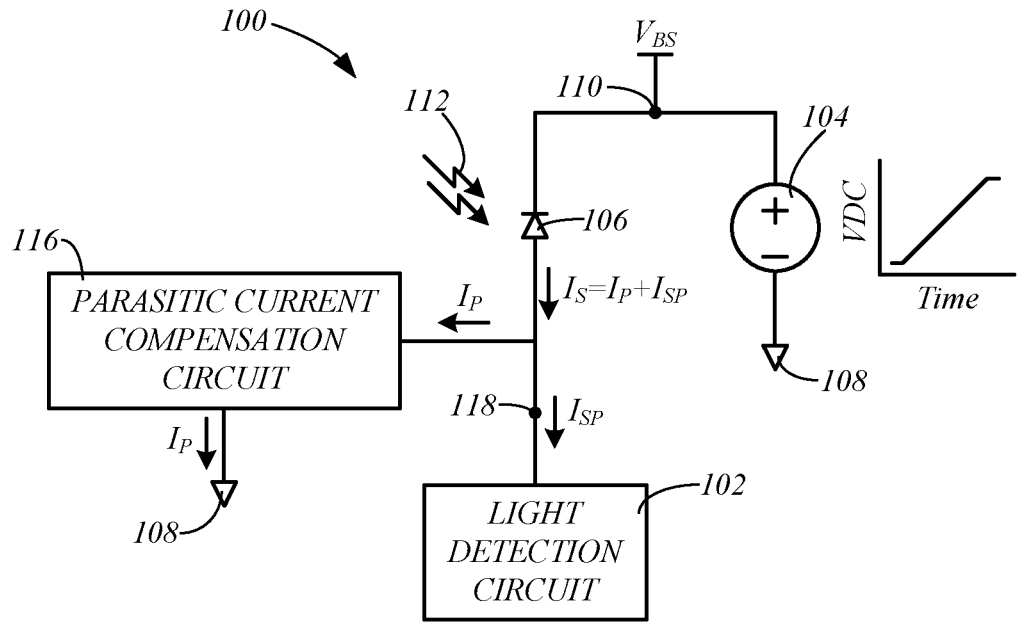
FIG. 1 is a simplified circuit diagram illustrating an optical receiver coupled to a light detection circuit, in accordance with embodiments of the present disclosure.

Avalanche photodiodes (APDs) are well-known devices that may be used in a variety of applications. APDs serve at least two functions: 1) conversion of optical signals into electrical signals, and 2) amplification of the electrical signal through avalanche multiplication. Typically, an APD has an absorption layer where an optical signal is absorbed. The optical signal includes a number of photons. Each photon impinging the absorption layer generates an electron-hole pair or a carrier. A multiplication layer in the APD is designed such that one carrier causes an avalanche of other carriers where the number of other carriers is dependent on the gain of the APD.

Optical receivers typically utilize a direct current (DC) voltage source in series with an APD that applies a fixed or non-time-varying DC bias voltage across the APD. A light detection circuit may be used to detect a sense photocurrent traveling through the APD, which changes in response to the exposure of the APD to light signals.

The gain of the APD may be adjusted based on the DC bias voltage applied to the APD by the DC voltage source. The higher the bias voltage, the more sensitive the APD is to light signals. Thus, the optical receiver may be configured to detect low intensity light signals or high intensity light signals based on the applied bias voltage.

In some applications, the optical receiver may be coupled to a light detection circuit that detects the light signals sensed by the APD. Such light detection circuits may be components of a Light Detection and Ranging (LIDAR) device, optical data receivers, and other devices or systems.

LIDAR devices detect distances to external objects based on a time of flight of light signals. For example, a light signal transmitted from an emitter is reflected off an object, and the reflected light signal is then detected using an optical receiver. The time from the transmission of the light signal to the reception of the reflected light signal is used to determine a distance to the object.

For some LIDAR applications, such as those used in surveying and autonomous mobile vehicles, it may be necessary to sense targets at both long and short ranges. The intensity of the light signals scattered or reflected from the targets obeys a well-known relationship with distance, namely the intensity of a light signal is attenuated at a rate of the inverse of the square of the distance the light signal travels. Thus, the intensity of the light signals rapidly diminishes with distance traveled.

As a result, the detection of light signals reflected from long range objects may require using interface electronics with high gain and sensing elements, like APDs, with intrinsic gain. Opposing constraints may be required for sensing shorter range objects, such as the use of lower gain interface electronics and APDs having lower sensitivity. This large dynamic range is sometimes referred to as 'starlight to daylight' in that the system may require many orders of magnitude of light signal range to be handled if the system is to perform in a quasi-linear or predictable manner.

Compounding these difficulties is the bandwidth that may be required of many systems, such as autonomous mobile vehicle systems, and that most amplifier configurations do not simultaneously have wide bandwidth, high gain, and wide dynamic range. Embodiments of the present disclosure relate to optical receivers that address one or more of these issues, and may provide other benefits.

FIG. 1 is a simplified circuit diagram illustrating and optical receiver 100 coupled to a light detection circuit 102, in accordance with embodiments of the present disclosure. The optical receiver 100 includes a variable DC voltage source 104 that is in series with a sense APD 106. Some elements may be tied to electrical ground or common 108. In one embodiment, the DC voltage source 104 modulates a DC bias voltage ($V_{BS}$) at a node 110 to drive the sense APD 106.

The variable DC voltage 104 source may take on any suitable form. One suitable variable DC voltage source 104 is a fixed DC voltage source in series with a Howland current source. Other suitable variable DC voltage sources 104 may also be used.

In one embodiment, the DC bias voltage $V_{BS}$ varies over time between a low DC voltage and a high DC voltage, such as indicated in FIG. 1. When the source 104 comprises a Howland current source, the time-varying DC bias voltage $V_{BS}$ may be provided by adjusting the voltage driving the Howland current source.

The varying DC bias voltage $V_{BS}$ allows the sense APD 106 to have a wide dynamic range. For example, when the generated DC bias voltage $V_{BS}$ is high, the sense APD 106 will have increased sensitivity to received light signals 112 thereby allowing the optical receiver 100 to detect low intensity light signals 112, such as those reflected from long range objects. When the generated DC bias voltage $V_{BS}$ is low, the sense APD 106 will have decreased sensitivity to received light signals 112 thereby allowing the optical receiver 100 to detect high intensity light signals 112, such as those reflected from short range objects.

The DC voltage range over which the source 104 biases the sense APD 106 may be selected based on the application for the optical receiver 100, the type of sense APD 106 used, and other factors. In one example, the DC bias voltage $V_{BS}$ may vary by 40 VDC from a low DC voltage of 20 VDC to a high DC voltage of 60 VDC, such as when using an indium-gallium-arsenide sense APD 106 that is generally sensitive to 1550 nm wavelength light signals 112. The DC voltage bias range may span 200 VDC, such as when using a silicon sense APD 106 that is generally sensitive to 900 nm wavelength light signals 112. Other DC bias voltage ranges may also be used.

The varying DC bias voltage $V_{BS}$ produced by the source 104 may have a ramp waveform (shown), a sawtooth waveform, or another suitable waveform, that varies between the low DC bias voltage and the high DC bias voltage over time. Additionally, the frequency of the waveform may be selected based on the application for the optical receiver 100. In one example, the frequency of the waveform is approximately 0.8 MHz-1.2 MHz, which may be suitable for autonomous mobile vehicle systems. Other waveform frequencies for the DC bias voltage $V_{BS}$ may also be used.

While driving the sense APD 106 with the time-varying DC bias voltage $V_{BS}$ effectively changes the intrinsic gain of the sense APD 106, and facilitates a controlled change in the electronic gain of any corresponding light detection circuit 102, it also may produce undesired effects. For example, the modulation of the DC bias voltage $V_{BS}$ may introduce a parasitic current $I_P$ from the capacitance of the sense APD 106. The parasitic current $I_P$ is based on the physical relationship of the product of the capacitance of the sense APD 106 and the rate of change in the DC bias voltage $V_{BS}$ ($I_P = c*dV_{BS}/dt$). Such parasitic currents become large when either large or fast swings of the bias voltage $V_{BS}$ occur.

Thus, during operation of the optical receiver 100, the time-varying DC bias voltage $V_{BS}$ is generated using the DC voltage source, and a sense current $I_S$ travels through the APD 106. The sense current $I_S$ is generally equal to the sum of the parasitic current $I_P$ generated by the sense APD 106 in response to the time-varying DC bias voltage $V_{BS}$, and a sense photocurrent $I_{SP}$ that is generated by the sense APD 106 in response to exposure of the sense APD 106 to light signals 112, as indicated in FIG. 1. As a result, parasitic current $I_P$ may obscure the sense photocurrent $I_{SP}$, and may prevent the light detection circuit 102 from operating properly.

In one embodiment, the optical receiver 100 includes a parasitic current compensation circuit (PCCC) 116 that operates to remove the parasitic current $I_P$ from the sense current $I_S$, as indicated in FIG. 1. As a result, the current at a measurement node 118, to which the light detection circuit 102 may be coupled, is equal to the sense current $I_S$ less the parasitic current $I_P$, due to its removal by the PCCC 116, leaving the sense photocurrent $I_{SP}$ at the measurement node 118. Accordingly, the sense photocurrent $I_{SP}$ is passed to the light detection circuit 102, thereby allowing the light detection circuit 102 to detect the light signals 112 indicated by the sense photocurrent $I_{SP}$.

Figure 2:
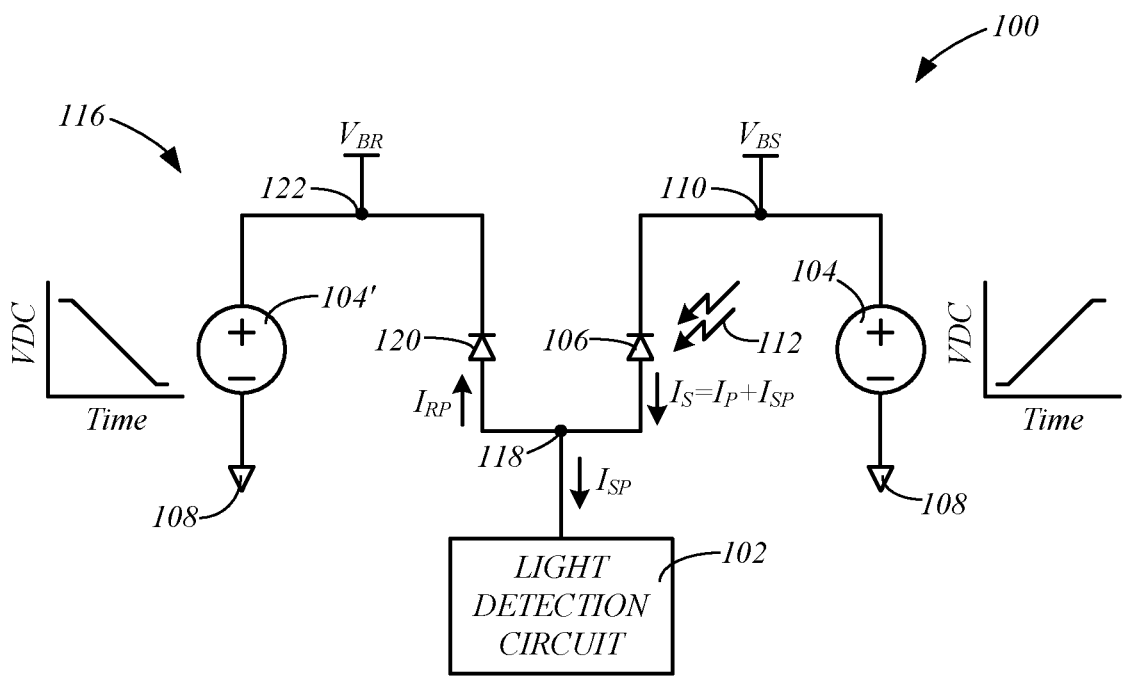
FIGS. 2 and 3 are simplified circuit diagrams of optical receivers having a parasitic current compensation circuit, in accordance with embodiments of the present disclosure.
Figure 3:
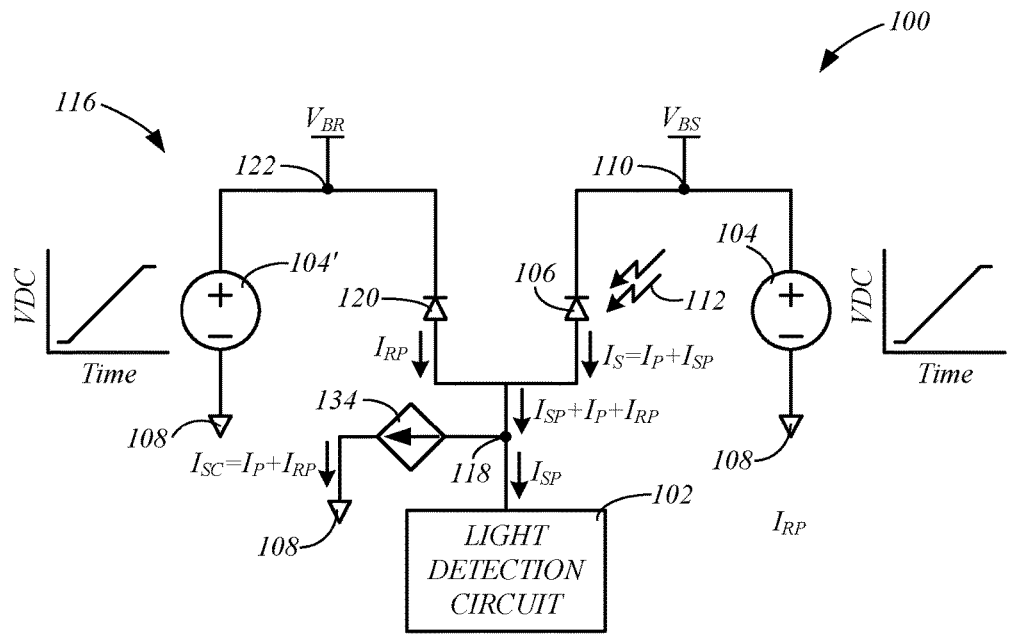

FIGS. 2 and 3 are simplified circuit diagrams of optical receivers 100 each having a PCCC 116, in accordance with embodiments of the present disclosure. Elements having the same or similar reference numbers correspond to the same or similar elements.

In one embodiment, the PCCC 116 includes a reference diode 120 having a capacitance (e.g., total capacitance under drive) that substantially (e.g., +/−10%) matches the capacitance (e.g., total capacitance under drive) of the sense APD 106. As a result, the reference diode 120 produces a substantially similar parasitic current (e.g., +/−10%) to that produced by the sense APD 106 when driven using a DC bias voltage $V_{BS}$ that changes at the same (or similar) rate as the DC bias voltage $V_{BS}$ applied to the sense APD 106.

The reference diode 120 may take the form of an APD that is shielded from light signals, such that it does not produce a sense photocurrent. In some embodiments, the reference diode 120 may be an APD that is selected from the same wafer forming the sense APD 106, to ensure a very close capacitance match.

In some embodiments, the reference diode 120 may be driven by a DC bias voltage $V_{BR}$ having a rate of change that is tailored to compensate for a difference in the capacitances between the reference diode 120 and the sense APD 106. Thus, the DC bias voltage $V_{BR}$ used to drive the reference diode 120 discussed below include such tailored DC bias voltages.

In some embodiments, the optical receiver 100 includes at least one DC voltage source including the DC voltage source 104 that generates the time-varying DC bias voltage $V_{BS}$ at node 110 that drives the sense APD 106, and a DC voltage source 104' that generates a time-varying DC bias voltage $V_{BR}$ at a node 122 that drives the reference diode 120. In some embodiments, since the DC bias voltage $V_{BR}$ is related to the DC bias voltage $V_{BS}$, only a single DC Voltage source, such as the DC voltage source 104, may be used to generate both the DC bias voltage $V_{BR}$ and the DC bias voltage $V_{BS}$ using conventional circuitry. Thus, while the at least one DC voltage source of the optical receiver 100 is shown as including separate DC voltage sources 104 and 104', it is understood that the optical receiver 100 may utilize a single DC voltage source. As a result, while the DC voltage sources 104 and 104' and the DC bias voltages $V_{BR}$ and $V_{BS}$ may be referenced separately, it is understood that such references may be to the same or related DC voltage source or bias voltage.

In one embodiment, the reference diode 120 and the sense APD 106 are connected in parallel to the measurement node 118, to which the light detection circuit 102 may be connected. Other configurations may also be used.

In one embodiment, the time-varying DC bias voltage $V_{BR}$ is substantially the opposite (e.g., +/−10%) of the time-varying DC bias voltage $V_{BS}$, as indicated in FIG. 2. Thus, the rate of change of the DC bias voltage $V_{BR}$ is substantially opposite the rate of change of the DC bias voltage $V_{BS}$. This causes a reference parasitic current $I_{RP}$ to travel through the reference diode 120 having an amplitude that substantially matches the amplitude of the parasitic current $I_P$ that travels through the sense APD 106, as shown in FIG. 2. However, due to the opposing time-varying DC bias voltages, the parasitic current $I_{RP}$ travels in the opposite direction relative to the measurement node from the parasitic current $I_P$. Accordingly, the current at the measurement node is equal to the sense current $I_S$ ($I_S=I_{SP}+I_P$) less the reference parasitic current $I_{RP}$ ($I_{RP}=-I_P$), leaving the sense photocurrent $I_{SP}$, as indicated in FIG. 2 The light detection circuit 102, which is coupled to the measurement node 118, may then process the sense photocurrent $I_{SP}$ to detect the exposure of the sense APD 106 to light signals 112.

In the embodiment of the optical receiver 100 shown in FIG. 3, the DC bias voltage $V_{BR}$ is substantially the same as the DC bias voltage $V_{BS}$. As a result, the rate of change of the DC bias voltage $V_{BR}$ is substantially the same as the rate of change of the DC bias voltage $V_{BS}$. This causes a reference parasitic current $I_{RP}$ to travel through the reference diode 120 having an amplitude that substantially matches the amplitude of the parasitic current $I_P$ that travels through the sense APD 106. Since the reference parasitic current $I_{RP}$ travels in the same direction as the parasitic current $I_P$ relative to the measurement node, the current at the measurement node 118 is equal to the sense current $I_S$ ($I_S=I_{SP}+I_P$) plus the reference parasitic current $I_{RP}$ ($I_{RP}=I_P$), resulting in a current $I_X$ that is equal to the sum of $I_S$ and $I_{RP}$, which is equal to the sum of $I_{SP}+2*(I_P)$.

In one embodiment, the PCCC 116 includes a shunt 134 (shown in FIG. 3) that removes a shunt current $I_{SC}$ from the node 118 that is equal to the sum of the reference parasitic current $I_{RP}$ and the parasitic current $I_P$. As a result, the current traveling from the measurement node 118 to the light detection circuit 102 is equal to the sense current $I_S$ less the reference parasitic current $I_{RP}$ or parasitic current $I_P$, leaving the sense photocurrent $I_{SP}$, as indicated in FIG. 3. The light detection circuit 102, which is coupled to the measurement node 118, may then process the sense photocurrent $I_{SP}$ to detect the exposure of the sense APD 106 to light signals 112.

Figure 4:
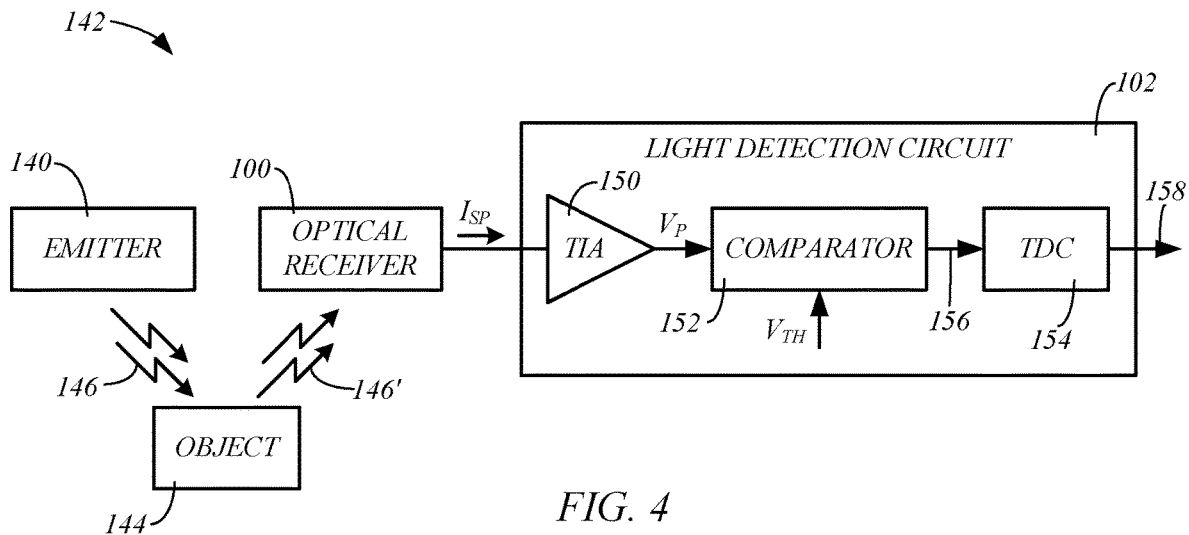
FIG. 4 is a simplified circuit diagram illustrating an example of a light detection circuit, in accordance with embodiments of the present disclosure.

FIG. 4 is a simplified circuit diagram illustrating an example of a light detection circuit 102 that may be used with a light emitter 140 and the optical receiver 100, formed in accordance with embodiments of the present disclosure, to form a LIDAR device 142 that may detect a distance to an external object 144.

The emitter 142 is configured to transmit light signals 146 in accordance with emitters used in conventional LIDAR devices.

One embodiment of the light detection circuit 102 includes a transimpedance amplifier (TIA) 150, a comparator 152, and a time-to-digital converter (TDC) 154. The TIA is coupled to the measurement node 118 of the optical receiver 100 (FIGS. 1-3) and receives the sense photocurrent $I_{SP}$. The TIA 150 is configured to produce a voltage pulse $V_P$ in response to the sense photocurrent $I_{SP}$.

The comparator 152 is configured to compare the voltage pulse $V_P$ to a threshold voltage $V_{TH}$ and produce a comparator output signal 156 based on the comparison. The TDC 154 is configured to receive the comparator output signal 156 and determine a time of flight between the transmission of a transmitted light signal 146 from the emitter 140 and an exposure of the sense APD 106 of the optical receiver 100 to a reflection 146' of the transmitted light signal 146 from the external object 144 based on the sense photocurrent $I_{SP}$, using conventional techniques. The TDC 154 may produce a signal 158 indicating the time of flight, from which the distance to the object may be determined.

Additional embodiments of the present disclosure relate to methods of using the optical receiver 100 formed in accordance with one or more embodiments of the present disclosure. In one embodiment, a sense APD 106 of the optical receiver 100 is driven by a time-varying DC bias voltage $V_{BS}$, and generates a sense current $I_S$, as discussed above with reference to FIGS. 1-3 The sense current $I_S$ is equal to the sum of a parasitic current $I_P$ that is generated based on a capacitance of the sense APD 106 in response to the time-varying DC bias voltage $V_{BS}$, and a sense photocurrent $I_{SP}$ that is generated based on the exposure of the APD 106 to a light signal 112.

In one embodiment, a PCCC 116 comprising a reference photodiode 120 removes the parasitic current $I_P$ from the sense current $I_S$ using one of the techniques disclosed herein, leaving only the sense photocurrent $I_{SP}$ at a measurement node 118.

In one embodiment of the method, a light detection circuit 102 coupled to the measurement node 118 receives the sense photocurrent $I_{SP}$, and uses the sense photocurrent $I_{SP}$ to detect a distance to an external object 144, as discussed above with reference to FIG. 4.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical receiver comprising:
    a parasitic current compensation circuit comprising a reference diode;
    a sense avalanche photodiode (APD);
    at least one DC voltage source configured to generate a first DC bias voltage that varies over time and drives the reference diode, and generate a second DC bias voltage that varies over time and drives the sense APD; and
    a measurement node,
    wherein:
    a reference parasitic current travels through the reference diode based on the first DC bias voltage;
    a sense current travels through the sense APD based on the second DC bias voltage and exposure of the sense APD to a light signal; and
    the measurement node receives a sense photocurrent, which is generated by the sense APD in response to the exposure of the sense APD to the light signal, the sense photocurrent comprising the sense current less the reference parasitic current.

2. The optical receiver of claim 1, wherein the reference diode comprises an APD that is shielded from light signals.

3. The optical receiver of claim 2, wherein the first and second DC bias voltages are waveforms that comprise a ramp waveform or a sawtooth waveform.

4. The optical receiver of claim 3, wherein the waveforms traverse a voltage range of 20 VDC-60 VDC, and the waveforms have a frequency of 0.8 MHz-1.2 MHz.

5. The optical receiver of claim 1, wherein the first DC bias voltage varies at a first rate, and the second DC bias voltage varies at a second rate that is opposite the first rate.

6. The optical receiver of claim 5, wherein the reference diode and the sense APD are connected in parallel with the measurement node.

7. The optical receiver of claim 1, wherein the first and second DC bias voltages are equal and change over time at a change rate.

8. The optical receiver of claim 7, wherein:
    the reference diode and the sense APD are connected in parallel with the measurement node; and
    the parasitic current compensation circuit comprises a shunt that extracts twice the reference current from the measurement node.

9. A light detector comprising: the optical receiver of claim 1; and
    a light detection circuit coupled to the measurement node and configured to detect the light signal based on the sense photocurrent.

10. A light detection and ranging (LIDAR) device comprising:
    a light emitter; and the light detector of claim 9,
    wherein the light detector comprises:
    a transimpedance amplifier configured to produce a voltage pulse in response to the sense photocurrent;
    a comparator configured to compare the voltage pulse to a threshold voltage and produce a comparator output signal; and
    a time-to-digital converter configured to receive the comparator output signal and determine an interval of time between the transmission of a transmitted light signal from the light signal emitter and an exposure of the sense APD to a reflection of the transmitted light signal from an external object based on the sense photocurrent.

* * * * *